(12) United States Patent
Kim et al.

(10) Patent No.: US 10,493,860 B2
(45) Date of Patent: Dec. 3, 2019

(54) METHOD OF CONTROLLING MOTOR SYSTEM OF ECO-FRIENDLY VEHICLE

(71) Applicant: HYUNDAI MOTOR COMPANY, Seoul (KR)

(72) Inventors: Seong Min Kim, Changwon-si (KR); Tae Il Yoo, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 114 days.

(21) Appl. No.: 15/495,299

(22) Filed: Apr. 24, 2017

(65) Prior Publication Data
US 2018/0141462 A1 May 24, 2018

(30) Foreign Application Priority Data
Nov. 24, 2016 (KR) .................. 10-2016-0157107

(51) Int. Cl.
*B60L 15/20* (2006.01)
*B60L 7/18* (2006.01)
*B60L 3/00* (2019.01)
*B60L 7/14* (2006.01)
*B60L 58/13* (2019.01)

(52) U.S. Cl.
CPC ........... *B60L 15/2045* (2013.01); *B60L 3/003* (2013.01); *B60L 3/0061* (2013.01); *B60L 7/14* (2013.01); *B60L 7/18* (2013.01); *B60L 15/2009* (2013.01); *B60L 58/13* (2019.02); B60L 2240/425 (2013.01); B60L 2240/525 (2013.01); Y02T 10/645 (2013.01); Y02T 10/7005 (2013.01); Y02T 10/705 (2013.01); Y02T 10/7044 (2013.01); Y02T 10/7283 (2013.01)

(58) Field of Classification Search
CPC .... B60W 20/00; B60W 20/26; B60W 20/244; B60W 20/18127; B60W 20/13; B60W 20/14; B60W 20/15; B60W 20/0657; Y02T 10/7005; Y02T 10/705; Y02T 10/7044; Y02T 10/7283; Y02T 10/70; Y02T 10/7258; B60K 7/0007; B60L 15/2045; B60L 15/1861; B60L 15/1851; Y10S 903/903; Y10T 477/23; Y10T 477/24
See application file for complete search history.

(56) References Cited

U.S. PATENT DOCUMENTS

| | | | | |
|---|---|---|---|---|
| 5,898,282 A * | 4/1999 | Drozdz | ............... | B60L 11/123 180/65.235 |
| 6,232,729 B1 * | 5/2001 | Inoue | ............... | B60L 58/10 318/139 |
| 7,104,347 B2 * | 9/2006 | Severinsky | ............ | B60H 1/004 180/65.23 |
| 7,267,191 B2 * | 9/2007 | Xu | ............... | B60K 6/445 180/65.245 |

(Continued)

*Primary Examiner* — Jelani A Smith
*Assistant Examiner* — Bakari Underwood
(74) *Attorney, Agent, or Firm* — Brinks Gilson & Lione

(57) ABSTRACT

The present disclosure provides a method of controlling a motor system of an eco-friendly vehicle, which includes: determining whether a regenerative braking is an on-state; upon determining that regenerative braking is the on-state, checking a battery state of charge (SoC); and upon checking that the battery SoC is fully recharged, entering into a motor low-efficiency control procedure that forcibly lowers a current driving point of a motor.

5 Claims, 2 Drawing Sheets

(56) References Cited

U.S. PATENT DOCUMENTS

Figure 1:
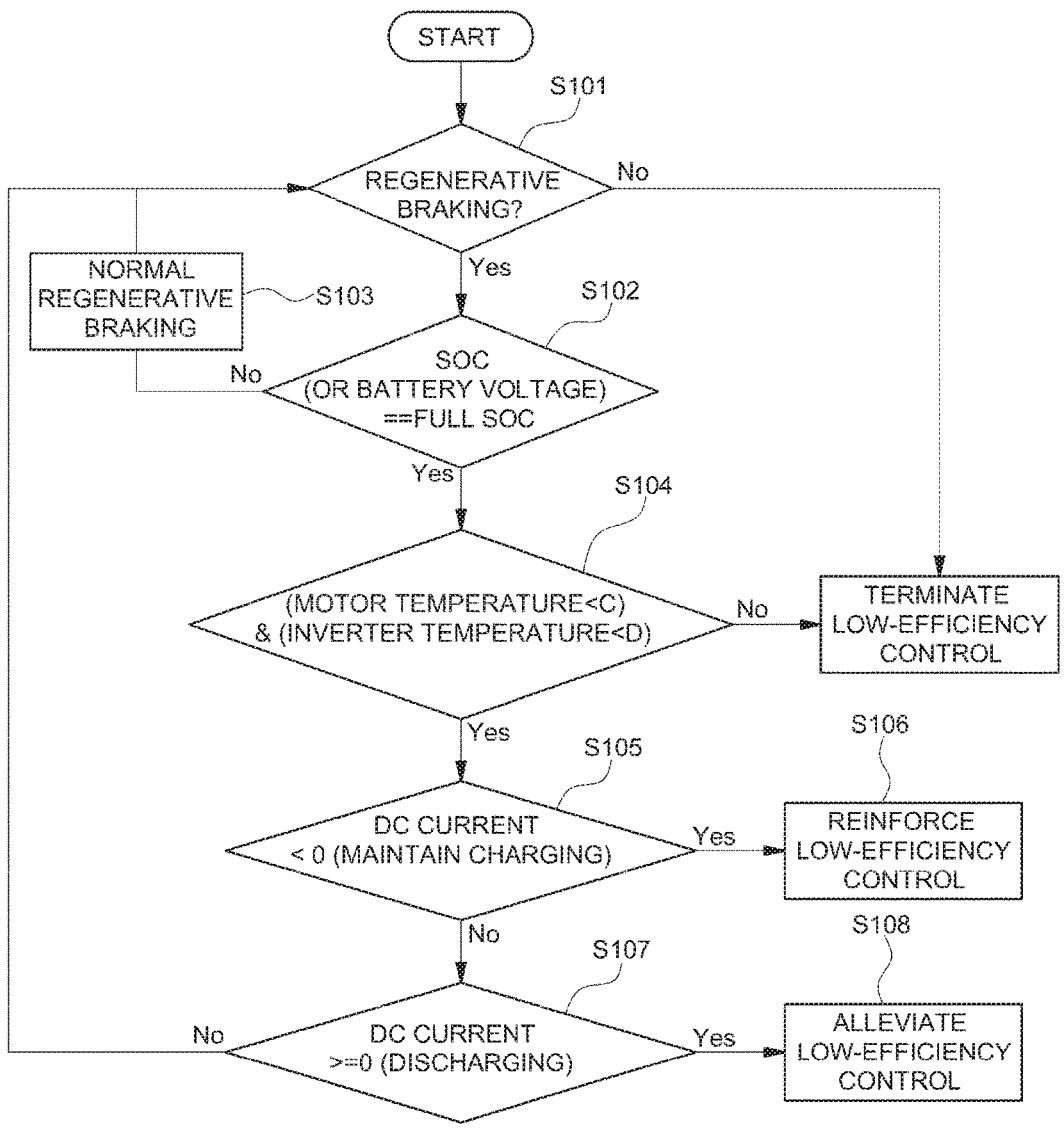

| | | | |
|---|---|---|---|
| 2010/0106353 A1* | 4/2010 | Watson | B60K 6/365 701/22 |
| 2014/0058609 A1* | 2/2014 | Matsuda | B62J 99/00 701/22 |
| 2015/0291148 A1* | 10/2015 | Sakai | B60K 6/445 701/22 |
| 2018/0186362 A1* | 7/2018 | Koga | F16H 61/02 |

* cited by examiner

METHOD OF CONTROLLING MOTOR SYSTEM OF ECO-FRIENDLY VEHICLE

CROSS-REFERENCE TO RELATED APPLICATION

The present application claims priority to and the benefit of Korean Patent Application No. 10-2016-0157107, filed on Nov. 24, 2016, which is incorporated herein by reference in its entirety.

FIELD

The present disclosure relates to a method of controlling a motor system of an eco-friendly vehicle. More particularly, it relates to a method of controlling a motor system of an eco-friendly vehicle, for preventing overcharge of a battery and protecting a motor from overheating during regenerative braking using low-efficiency control of the motor system.

BACKGROUND

The statements in this section merely provide background information related to the present disclosure and may not constitute the related art.

An eco-friendly vehicle such as a hybrid vehicle, an electric vehicle, and a fuel cell electric vehicle includes a motor system installed therein for driving and power generation.

The motor system includes a motor for driving and regenerative braking, an inverter for motor control and power-generation control, a high-voltage rechargeable battery (hereinafter, referred to as a battery) that is connected to a motor and an inverter, and so on.

In most eco-friendly vehicles including such a motor system installed therein, a regenerative braking mode as well as a driving mode is applied. The regenerative braking mode is configured such that braking and inertial energy of a vehicle is recovered by a motor through power generation to recharge a battery, and the driving mode includes driving of a motor alone or driving of a motor and an engine.

A time for recharging a battery via regenerative braking is changed according to the characteristics of a battery of an eco-friendly vehicle because recharging needs to be stopped when a battery is fully recharged.

However, when regenerative braking is stopped in order to discontinue recharging while the battery is fully recharged, driving inconvenience may occur and, thus, continuous regenerative braking is desired and discontinuing battery charging is also desired in order to reduce the driving inconvenience

SUMMARY

One aspect of the present disclosure provides a method of controlling a motor system of an eco-friendly vehicle, for preventing overcharge of a battery and, simultaneously, protecting a motor and an inverter from overheating using low-efficiency control of the motor system during regenerative braking when the battery is fully charged.

In one form of the present disclosure, a method of controlling a motor system of an eco-friendly vehicle includes: determining whether a regenerative braking state is in an on-state; upon determining that regenerative braking state proceeds, checking a battery state of charge (SoC); upon determining that the battery SoC is fully recharged, entering a motor low-efficiency control procedure that forcibly lowers a current driving point of a motor.

In the entering, the motor low-efficiency control procedure may include a reinforcement operation of low-efficiency control of lowering the current driving point of the motor to a predetermined level or above while the battery is recharged and an alleviation operation of low-efficiency control of lowering the current driving point of the motor to the predetermined level or below while the battery is discharged.

When the battery SoC is determined not to be fully recharged, the motor may be operated at a driving point for normal regenerative braking.

The method may further include checking temperatures of a motor and an inverter prior to entering into the motor low-efficiency control procedure while the battery SoC is fully recharged, and, when the temperatures of the motor and the inverter are greater than reference values, entering into the motor low-efficiency control is prevented.

When entering into the motor low-efficiency control procedure is prevented, the motor may be operated at a driving point for normal regenerative braking.

An insufficient regenerative braking amount due to the motor low-efficiency control may be compensated for by hydraulic braking force.

Further areas of applicability will become apparent from the description provided herein. It should be understood that the description and specific examples are intended for purposes of illustration only and are not intended to limit the scope of the present disclosure.

DRAWINGS

Figure 2:
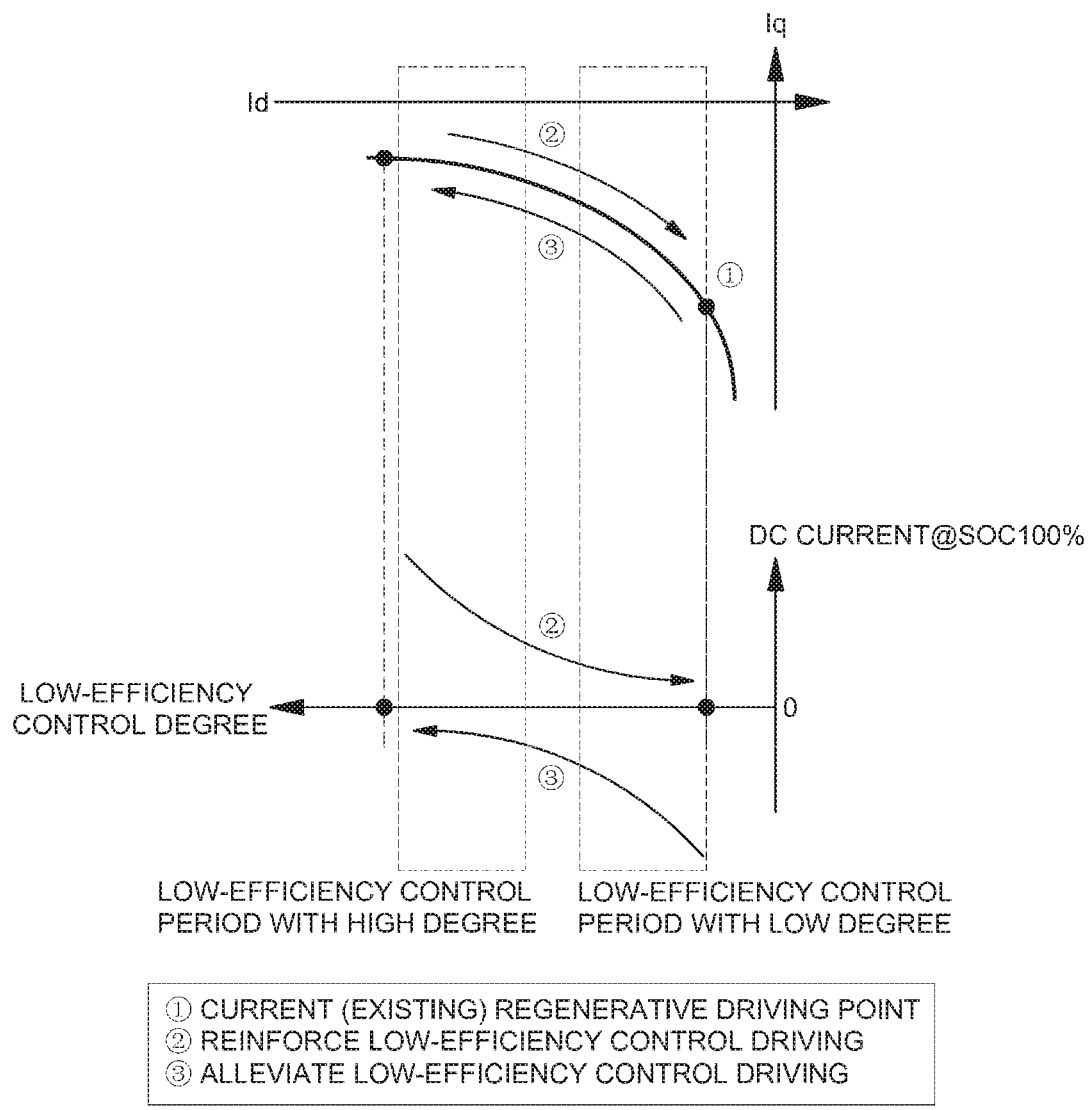

In order that the disclosure may be well understood, there will now be described various forms thereof, given by way of example, reference being made to the accompanying drawings, in which:

FIG. 1 is a flowchart of a method of controlling a motor system of an eco-friendly vehicle; and FIG. 2 is a diagram illustrating a method of controlling a motor system of an eco-friendly vehicle.

DETAILED DESCRIPTION

The following description is merely exemplary in nature and is not intended to limit the present disclosure, application, or uses. It should be understood that throughout the drawings, corresponding reference numerals indicate like or corresponding parts and features.

When a battery is fully recharged (100% state of charge (SoC)) via regenerative braking for a long time, regenerative braking may be stopped in order to discontinue battery charging, but it may be disadvantageous in that vehicle operability is affected so as to make a driver feel inconvenient (feeling driving inconvenience when entire required braking force is converted only into hydraulic braking force as regenerative braking is stopped).

Regenerative braking may be maintained and, simultaneously, only battery charge may be stopped in order to ensure stable braking operability of a vehicle.

According to the present disclosure, regenerative braking may be maintained using low-efficiency control of a motor system and, simultaneously, only battery charge (100% SoC) may be shut off so as to stably maintain braking operability of a vehicle and to prevent battery overcharge.

In other words, the present disclosure relates to an eco-friendly vehicle including a motor system (motor+inverter+ battery) as a driving source and, in this case, when a battery is fully charged during regenerative braking, a charge and discharge state of a battery may be monitored via direct current (DC) current such that the motor system performs active low-efficiency control so as to stably maintain braking operability of a vehicle and to prevent battery overcharge.

For reference, low-efficiency control of the motor system may be referred to as compulsory weak-flux control and may mean a scheme for compulsorily lowering efficiency of the motor system as a motor is driven at a driving point but not a pre-established optimal current driving point despite motor loss in consideration of current ripple, an amount of current, and so on, which are applied to the motor.

Here, a method of controlling a motor system of an eco-friendly vehicle according to the present disclosure will be sequentially described below with reference to FIGS. 1 and 2.

First, whether a regenerative braking state proceeds may be determined during driving of an eco-friendly vehicle (S101).

Then, upon determining that the regenerative braking state proceeds, a battery SoC may be checked (S102).

For example, the highest controller of an eco-friendly vehicle determines whether the regenerative braking is in an on-state based on a motor torque signal transmitted from a motor, and a current battery SoC remaining power signal may be received from a battery controller to check a battery SoC.

As a result of the checked battery SoC, when the battery SoC is not fully recharged (SoC is not 100%), the regenerative braking may normally proceed based on a current motor driving point (S103).

That is, when the battery SoC is not fully recharged (SoC is not 100%), the motor may be driven at a current motor driving point (which is indicated by ① in FIG. 2) for normal regenerative braking.

On the other hand, as a result of the checked battery SoC, when the battery SoC is fully recharged (SoC of 100%), the method enters a motor low-efficiency control procedure of compulsorily lowering a current driving point of a motor.

In this case, before the method enters the motor low-efficiency control procedure, an operation of checking temperatures of a motor and an inverter may be further performed (S104), and when the temperature of the motor is greater than a reference value (c) and the temperature of the inverter is also greater than a reference value (d), even if the battery SoC is 100%, entry into the motor low-efficiency control procedure may be prevented and, accordingly, the motor may be driven at a driving point for normal regenerative braking.

For example, when the battery SoC is 100% during regenerative braking of the highest controller, a command for entry into the motor low-efficiency control procedure of compulsorily lowering a current driving point of the motor is issued to the motor controller but, exceptionally, when the temperature of the motor is greater than the reference value (c) and the temperature of the inverter is greater than the reference value (d), control may be performed to stop entry into the motor low-efficiency control procedure.

As such, even if the battery SoC is 100% during regenerative braking, when the motor temperature is greater than the reference value (c) and the inverter temperature is greater than the reference value (d), entry into the motor low-efficiency control procedure is stopped in order to protect the motor and the inverter from overheating because the motor system including the motor and the inverter additionally generates heat to further increase the temperatures of the motor and the inverter during motor low-efficiency control.

Then, as described above, when the battery SoC is 100% during regenerative braking, the motor temperature is less than the reference value (c), and the inverter temperature is less than the reference value (d), the method may actually enter the motor low-efficiency control procedure of compulsorily lowering a current driving point of the motor.

In this case, the motor low-efficiency control procedure may be performed by the motor controller that receives the commands for motor low-efficiency control from the highest controller and, in this case, may be divided into a reinforcement operation (which is indicated by ③ in FIG. 2) and an alleviation operation (which is indicated by ② in FIG. 2) and performed.

The reinforcement operation of the motor low-efficiency control may be performed via control of lowering a current motor driving point up to a low-efficiency period (a period with a high low-efficiency control degree) of a predetermined level or above by the motor controller when charge is maintained despite a battery SoC, i.e., a battery SoC of 100%.

In more detail, a state in which charge is maintained despite a battery SoC of 100% may be determined using battery current, i.e., DC current, and when DC current is less than zero (0), the current state may be considered a non-discharge state, and the reinforcement operation of motor low-efficiency control for lowering a current motor driving point up to a low-efficiency period (a period with a high low-efficiency control degree) of a predetermined level or above by the motor controller may be performed (S105 and S106).

As such, the reinforcement operation of the motor low-efficiency control is performed, that is, control for lowering a current motor driving point up to a low-efficiency period (a period with a high low-efficiency control degree) of a predetermined level or above by the motor controller is performed in order to reduce a regenerative braking amount for battery charging and, simultaneously, to reduce a battery charge amount by converting the driving point of the motor into a low-efficiency period (a period with a high low-efficiency control degree) below than the current driving point by a predetermined level.

Accordingly, a regenerative braking amount is reduced via the reinforcement operation of the motor low-efficiency control, but regenerative braking of the motor is maintained so as to prevent a sense of driving inconvenience during regenerative braking, thereby preventing overcharge via reduction in the regenerative braking amount.

On the other hand, the alleviation operation of the motor low-efficiency control may be performed via control of lowering a current motor driving point up to a low-efficiency period (a period with a low low-efficiency control degree) of a predetermined level or less by the motor controller when battery discharge occurs due to electric field load while the battery is fully recharged.

In more detail, a state in which battery discharge occurs while the battery is fully recharged may be determined using DC current, and when DC current is zero (0) or more, the current state may be considered a battery-discharge state, and the alleviation operation of motor low-efficiency control for lowering a current motor driving point up to a low-efficiency period (a period with a low low-efficiency control degree) of a predetermined level or below by the motor controller may be performed (S107 and S108).

Accordingly, a regenerative braking amount of the motor for battery charging may be reduced and, simultaneously, a battery charging amount may be reduced via the alleviation operation of the motor low-efficiency control and, accordingly, a regenerative braking amount may be reduced but regenerative braking of the motor may be maintained so as to prevent a sense of driving inconvenience during regenerative braking, thereby preventing overcharge via reduction in the regenerative braking amount.

An insufficient regenerative braking amount due to the above motor low-efficiency control may be compensated for by hydraulic braking force.

That is, an entire braking amount of the eco-friendly vehicle may be the sum of an entire braking amount and a regenerative braking amount and, in this regard, auxiliary control may be performed to increase hydraulic braking force by a brake controller by an insufficient regenerative braking amount due to the above motor low-efficiency control.

As described above, when a battery SoC is fully recharged during regenerative braking, a current driving point of a motor may be forcibly converted into a low-efficiency driving point using low-efficiency control of a motor system so as to prevent overcharge of a battery while maintaining regenerative braking, and when temperatures of a motor and an inverter are checked prior to the low-efficiency control of the motor system and are equal to or more than reference values, the low-efficiency control procedure of additionally generating heat in the motor and the inverter may be stopped so as to protect the motor and the inverter from overheating.

The present disclosure may provide the following advantages.

First, when a battery SoC is fully recharged during regenerative braking, a current driving point of a motor may be forcibly converted into a low-efficiency driving point using low-efficiency control of a motor system and, thus, regenerative braking of the motor is maintained so as to prevent a sense of driving inconvenience during regenerative braking, thereby preventing overcharge via reduction in the regenerative braking amount.

Second, when temperatures of a motor and an inverter are checked prior to the low-efficiency control of the motor system and are equal to or more than reference values, the low-efficiency control procedure of additionally generating heat to the motor and the inverter may be stopped so as to protect the motor and the inverter from overheating.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling a motor system of an eco-friendly vehicle, the method comprising:
    determining whether a regenerative braking state is in an on-state;
    after the regenerative braking state is determined to be in the on-state, checking a battery state of charge (SoC);
    after the battery SoC is determined to be fully recharged, checking whether a motor temperature is less than a first predetermined value and an inverter temperature is less than a second predetermined value;
    after the motor temperature is checked to be less than the first predetermined value and the inverter temperature is checked to be less than the second predetermined value, entering into a motor low-efficiency control procedure that forcibly lowers a current driving point of a motor;
    after entering into the motor low-efficiency control procedure, determining whether a DC current of the battery is less than zero;
    after the DC current of the battery is determined to be less than zero, reinforcing the motor low-efficiency control procedure by lowering the current driving point of the motor to a period with a high low-efficiency control degree; and
    after the DC current of the battery is determined to be greater than or equal to zero, alleviating the motor low-efficiency control procedure by lowering the current driving point of the motor to a period with a low low-efficiency control degree.

2. The method of claim 1, wherein the method comprises:
    when the battery SoC is determined not to be fully recharged, operating the current driving point of the motor with a normal regenerative braking.

3. The method of claim 1, wherein the method further comprises:
    when the motor temperature is checked to be greater than the first predetermined value and the inverter temperature is checked to be greater than the second predetermined value, preventing an entry into the motor low-efficiency control procedure.

4. The method of claim 3, wherein the method comprises:
    when the entry into the motor low-efficiency control procedure is prevented, operating the current driving point of the motor with the normal regenerative braking.

5. The method of claim 1, wherein the method comprises:
    compensating an insufficient regenerative braking amount due to the motor low-efficiency control by hydraulic braking force.

* * * * *